United States Patent
Liu

(10) Patent No.: US 9,257,252 B2
(45) Date of Patent: Feb. 9, 2016

(54) INTELLIGENT MAGNETIC LATCHING MINIATURE CIRCUIT BREAKER AND CONTROL METHOD THEREFOR

(71) Applicant: Zhenyang Liu, Nanjing (CN)

(72) Inventor: Zhenyang Liu, Nanjing (CN)

(*) Notice: Subject to any disclaimer, the term of this patent is extended or adjusted under 35 U.S.C. 154(b) by 100 days.

(21) Appl. No.: 14/129,294

(22) PCT Filed: Dec. 13, 2012

(86) PCT No.: PCT/CN2012/001695
§ 371 (c)(1),
(2) Date: Dec. 26, 2013

(87) PCT Pub. No.: WO2013/097289
PCT Pub. Date: Jul. 4, 2013

(65) Prior Publication Data
US 2014/0313630 A1   Oct. 23, 2014

(30) Foreign Application Priority Data

Dec. 26, 2011  (CN) .......................... 2011 1 0441805

(51) Int. Cl.
*H01H 77/06* (2006.01)
*H01H 71/32* (2006.01)
*H02J 13/00* (2006.01)

(52) U.S. Cl.
CPC ............. *H01H 77/06* (2013.01); *H01H 71/323* (2013.01); *H02J 13/00* (2013.01); *H01H 2300/03* (2013.01)

(58) Field of Classification Search
CPC ...................................................... H01H 73/00
USPC ........................................................ 361/115
See application file for complete search history.

(56) References Cited

U.S. PATENT DOCUMENTS

| | | | | |
|---|---|---|---|---|
| 5,886,860 A * | 3/1999 | Chen | ...................... | H02H 9/026 361/106 |
| 5,926,081 A * | 7/1999 | DiMarco | .............. | H01H 77/102 335/16 |
| 8,773,827 B2 * | 7/2014 | Kiko | ...................... | H01H 47/22 361/2 |
| 2003/0210114 A1 * | 11/2003 | Brandon | .............. | H01H 71/524 335/21 |
| 2009/0206059 A1 * | 8/2009 | Kiko | ...................... | H01H 47/22 218/143 |

* cited by examiner

*Primary Examiner* — Dharti Patel
(74) *Attorney, Agent, or Firm* — George G. Wang; Bei & Ocean

(57) ABSTRACT

This invention discloses a type of intelligent magnetic-hold miniature circuit breaker and its control method, comprising a casing, a magnetic-hold relay, and a drive circuit, wherein said drive circuit receives control signal and then drives operation of said magnetic-hold relay; said magnetic-hold relay comprises a dynamic spring assembly, a static spring assembly, a deflector rod, a pushing piece, and a magnetic steel assembly; rotation of said magnetic steel assembly drives said deflector rod and then closing or opening of contacts of said dynamic spring assembly and said static spring assembly via said pushing piece; said miniature circuit breaker also includes a central processor, a communication chip, and a voltage state circuit; and said deflector rod extends out through a hole on said casing to allow manual operation. This invention breaks through traditional miniature circuit breaker design concept, and in terms of functions, realizes manual operation with priority and coordination between manual operation and remote operation in normal state, as well as protection in abnormal state, i.e. in case of interruption of commercial power supply followed by its restoration, clearing and addition of manual opening record.

10 Claims, 7 Drawing Sheets

INTELLIGENT MAGNETIC LATCHING MINIATURE CIRCUIT BREAKER AND CONTROL METHOD THEREFOR

CROSS-REFERENCE TO RELATED APPLICATIONS

This application claims priority from CN Application No. 201110441805.6, filed Dec. 26, 2011 and PCT Application No. PCT/CN2012/001695, filed Dec. 13, 2012, the contents of which are incorporated herein in the entirety by reference.

FIELD OF THE INVENTION

This invention relates to a type of circuit breaker, in particular an intelligent magnetic-hold miniature circuit breaker in the field of miniature circuit breaker.

BACKGROUND OF THE INVENTION

Miniature circuit breaker is a type of terminal protection electric appliance most widely used for building electric terminal power distribution devices. Miniature circuit breaker is just a type of mechanical switching electric appliance with limited functions and its normal operations are only manual. This electric appliance cannot satisfy ever higher requirements on power distribution system informatization, networking, intelligentization, and multiple functions. Development of a type of multi-function intelligent miniature circuit breaker has become the grand trend and the direction of miniature circuit breaker.

Magnetic-hold relay is a new type of relay developed in recent years. It is also a type of automatic switch. Originally, magnetic-hold relay is mainly used for electricity meters that allow prepaid charging using IC card and centralized meter reading. Although magnetic-hold relay is a type of automatic switch, it can only be applied with a matching control circuit. In particular, existing magnetic-hold relays lack the function of complete coordination between manual operation and automatic operation.

With advent of the age of Internet of Things, intelligent home is gradually entering ordinary households, so that development of home miniature circuit breaker of reliable performance, simple structure, easy manufacture, and low cost, satisfying habit of common people, and providing intelligent control, is urgent.

SUMMARY OF THE INVENTIONS

This invention is aimed to overcome aforesaid technical disadvantages of prior art and provide a type of intelligent magnetic-hold miniature circuit breaker and its control method with priority given to manual operation and allowing coordination between manual operation and remote operation, meeting low voltage one-pole (1P) miniature circuit breaker outline standard.

The technical scheme adopted by this invention is described below:

A type of intelligent magnetic-hold miniature circuit breaker, comprising a casing, a magnetic-hold relay, and a drive circuit; wherein said drive circuit receives control signal and then drives operation of said magnetic-hold relay; said magnetic-hold relay comprises a dynamic spring assembly, a static spring assembly, a deflector rod, a pushing piece, and a magnetic steel assembly; rotation of said magnetic steel assembly drives said deflector rod and then closing or opening of contacts of said dynamic spring assembly and said static spring assembly via said pushing piece; said miniature circuit breaker also includes a central processor, a communication chip, and a voltage state circuit; said communication chip is connected to said central processor and used for information interaction between said central processor and outside; said central processor is connected to said drive circuit and used to transmit control signal to said drive circuit; one end of said voltage state circuit is connected to the extension wire of the dynamic spring assembly, and the other end is connected to said central processor, used to transmit operating state signal of said magnetic-hold relay to said central processor; and said deflector rod extends out through a hole on said casing to allow manual operation.

Said operating state signal is a voltage signal, and said voltage state circuit comprises two resistors and one convertor; wherein one end of the first resistor is connected to the live wire of commercial power supply and the other end is connected to the second resistor and the input end of said convertor, and the other end of said second resistor is earthed; wherein the output end of said convertor is connected to said central processor and said convertor converts the voltage generated by voltage division of said two resistors to the input voltage of said central processor.

Said convertor comprises three resistors and one triode; wherein one end of the first resistor is used as the input end and the other end is connected to the second resistor and base of said triode, and the other end of said second resistor is earthed; wherein emitter of said triode is connected to one end of the third resistor and used as output end of said convertor, collector of said triode is earthed, and the other end of said third resistor is connected to convertor power supply.

Said second resistor and said triode in said convertor can be replaced by optic couplers for isolation between strong power source and the central processor.

A power supply module is provided to supply power to circuit or module in said casing. Said power supply module comprises a capacitor step-down module, a full wave rectification module, a filtering module, and a voltage stabilization module; said capacitor step-down module realizes connection to live wire via current limiting; and said full wave rectification module can increase the current to reduce volume of the HV capacitor in said capacitor step-down module.

A control method of a type of intelligent magnetic-hold miniature circuit breaker, comprising the following steps under commercial power supply: receive operating command from remote control end and judge if this command is closing command or not; if positive, continue to judge presence of manual opening record or not; if present, transmit manual opening record to said remote control end and then the operation procedure is complete; and if not present, execute the closing command and feedback execution result to said remote control end, and then the operation procedure is complete.

If negative (not closing command), continue to judge if this command is opening command or not; if negative, the operation procedure is complete; if positive, continue to judge presence of manual opening record or not; if present, transmit manual opening record to said remote control end and then the operation procedure is complete; and if not present, execute the opening command and feedback execution result to said remote control end, and then the operation procedure is complete.

Steps of generation and clearing of manual opening record are as follows: when said circuit breaker is manually opened, manual opening record is generated and notified to said remote control end; when said circuit breaker is manually closed, manual opening record is cleared, with said remote control end notified.

Steps of generation and clearing of manual opening record in case of interruption of commercial power supply followed by its restoration are as follows: judge if said circuit breaker is open; if negative, continue to judge presence of manual opening record; if present, clear this manual opening record and notify said remote control end, and then the procedure is complete; and if not present, the procedure is complete.

If positive (said circuit breaker is open), continue to judge presence of manual opening record; if present, the procedure is complete; and if not present, generate manual opening record and notify said remote control end, and then the procedure is complete.

The magnetic-hold relay is the critical component of this invention. In existing mature technology, rated current of magnetic-hold relay is 80 A, but its outline does not satisfy requirements by this invention. It is necessary to design parts of magnetic-hold relay and casing internal structure to an integral assembly to satisfy casing outline fully compatible with low voltage one pole (1P) miniature circuit breaker outline standard. Miniature circuit breaker standard (GB10963.1-2005) clearly specifies required indices on contact breaking capacity and experiment code, while indices of contact breaking capacity required by magnetic-hold relay standard (JB/T10923-2010) are lower than those specified by the miniature circuit breaker standard. Therefore, based on existing magnetic-hold relay standard, overload protection adopted for this invention can only be realized by complementation using an electronic control part, with hardware circuits simplified by software. Although open state and closed state of contact of magnetic-hold relay are maintained by the magnetic force generated by a permanent magnet at other times, for opening or closing of this contact, just use positive or negative DC pulse voltage to energize the coil, so that this relay can convert open state and closed state in an instant. However, since the DC pulse voltage is 9V (7.5V-13.5V), its current is 100 mA and its pulse width is 80-100 ms, this invention needs to design power supply satisfying requirements in a limited space. The difficulty of design of the electronic part is miniaturization: while metering part and central processor can be miniaturized by chip type selection, power supply cannot be miniaturized by type selection, and innovative design is required to this end.

Compared with prior art, this invention adopts miniature circuit breaker outline standard and directly assembles the magnetic-hold relay of rated current of 80 A inside the casing of this intelligent magnetic-hold miniature circuit breaker, not only improving resistance to interference between strong power source part and weak power source part, but also effectively saving space inside casing of this miniature circuit breaker. This invention breaks through the mechanical switching mode of miniature circuit breakers, and replaces mechanical switch by magnetic-hold relay technique. Through integrated design of casing and magnetic-hold relay, space is reserved for installation of the electronic part.

In terms of functions, this invention realizes manual operation with priority and coordination between manual operation and remote operation in normal state, as well as protection in abnormal state, i.e. in case of interruption of commercial power supply followed by its restoration, clearing and addition of manual opening record.

DETAILED DESCRIPTION OF PARTICULAR EMBODIMENTS OF THE INVENTION

Figure 1:
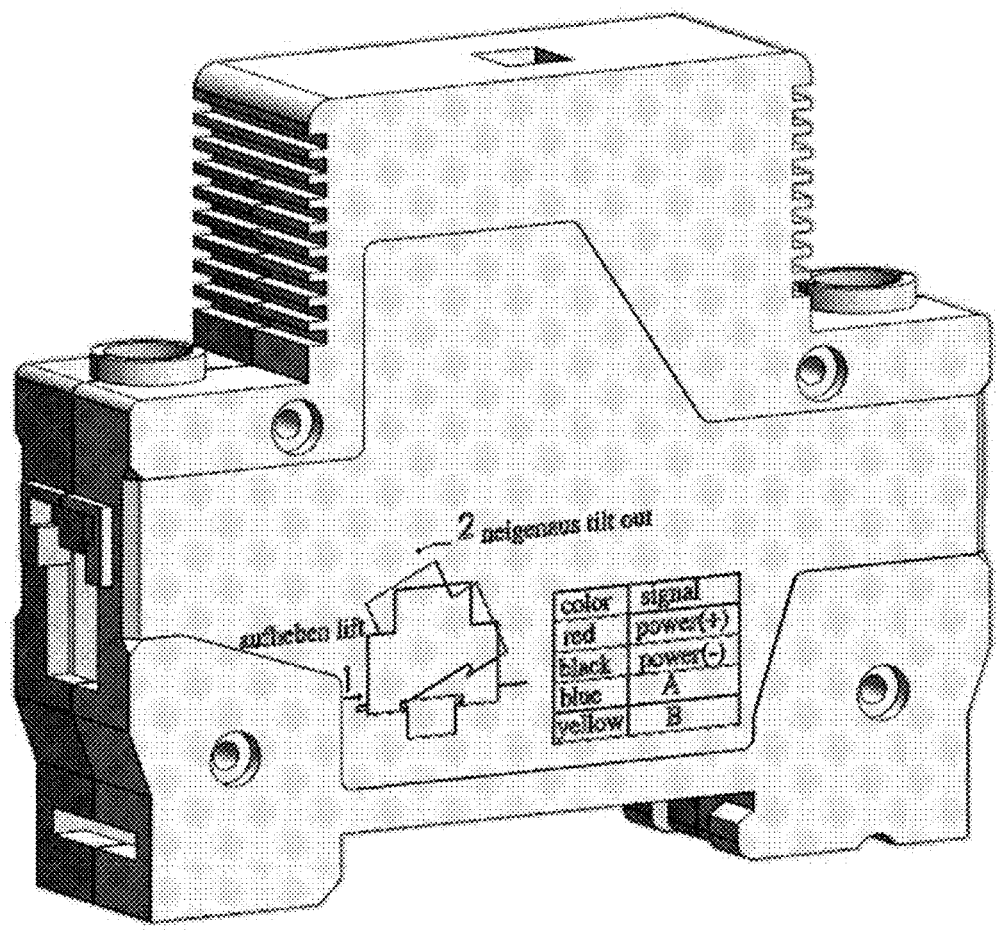
FIG. 1 is an outline of existing low voltage one pole (1P) miniature circuit breaker.

Refer to FIG. 1. The outline of this invention adopts the outline of existing low voltage one-pole (1P) miniature circuit breaker, assembled between a pedestal and an upper cover using rivets, embedded into guide rail using the mode specified by national standard GB10963, and fixed onto the guide rail using the elasticity of a snap board, realizing full compatibility with outline and installation mode of existing low voltage one-pole (1P) miniature circuit breaker.

Figure 2:
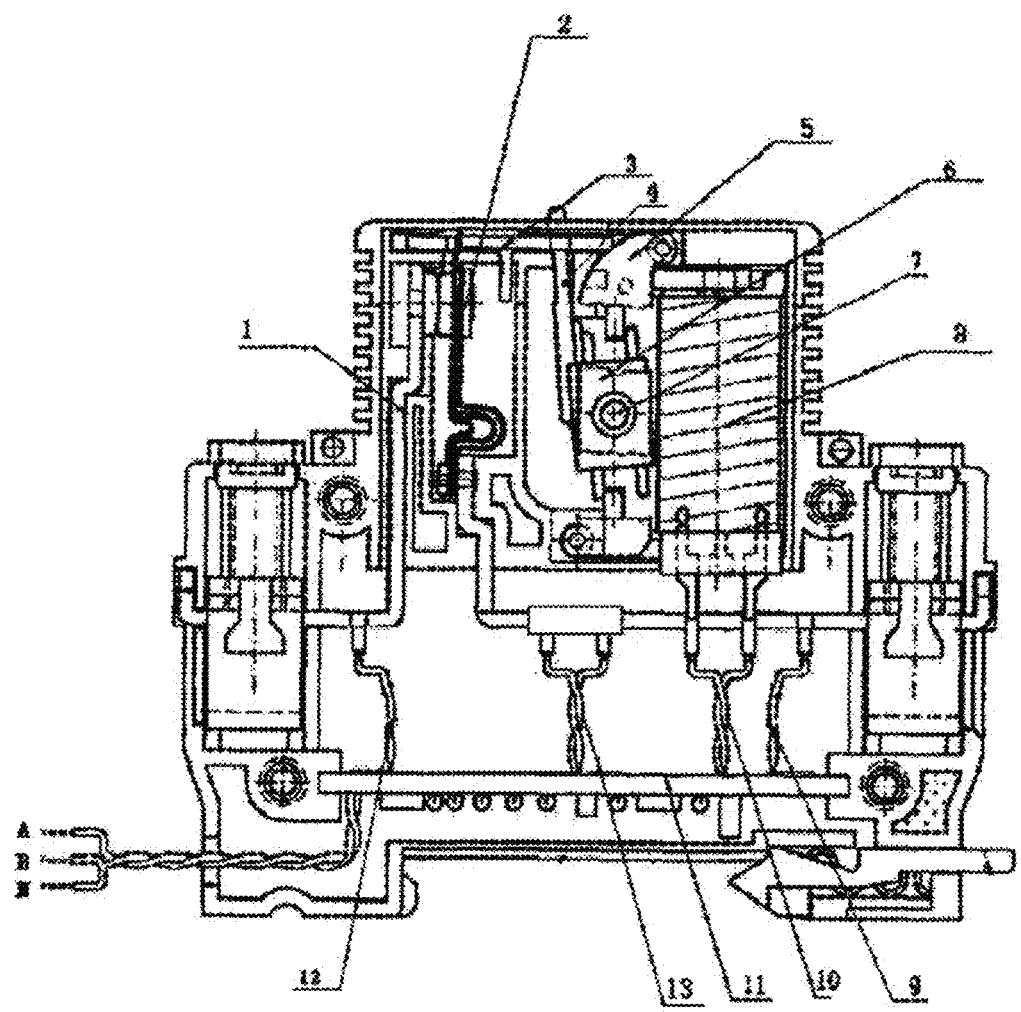
FIG. 2 is a structural schematic of this invention.
Figure 3:
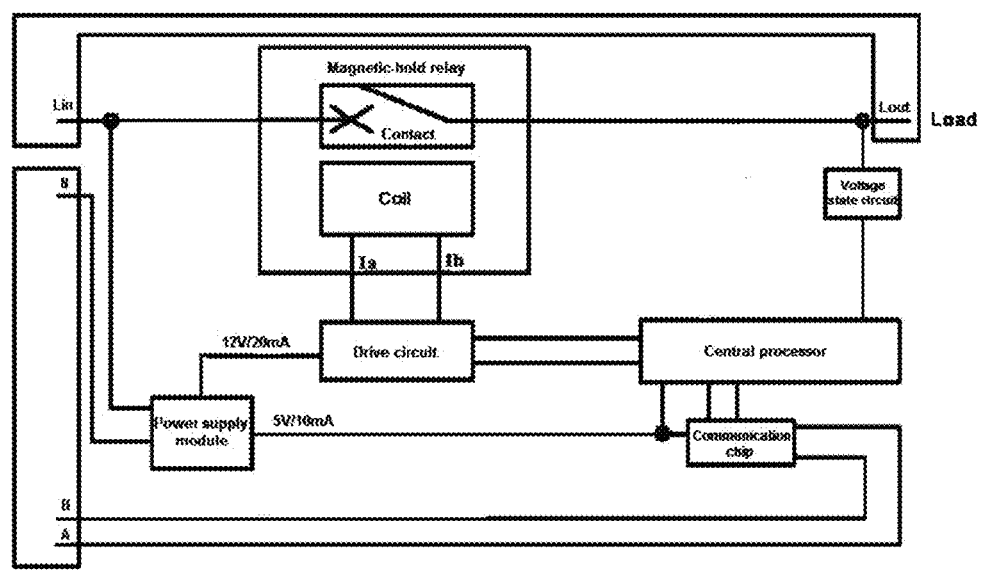
FIG. 3 is a structural block diagram of the circuits of this invention.

Refer to FIG. 2 and FIG. 3. A type of intelligent magnetic-hold miniature circuit breaker, comprising a casing, a magnetic-hold relay, and a drive circuit, wherein said drive circuit receives control signal and then drives operation of said magnetic-hold relay; said magnetic-hold relay comprises a dynamic spring assembly 2, a static spring assembly 1, a deflector rod 4, a pushing piece 3, a magnetic steel assembly 6, an iron core 8 with wound coil, a yoke iron assembly 5, and a rotating shaft 7; rotation of said magnetic steel assembly 6 drives said deflector rod 4 and then closing or opening of contacts of said dynamic spring assembly 2 and said static spring assembly 1 via said pushing piece 3; and the intelligent controller 11 comprises a central processor, a communication chip, a drive circuit, a power supply module, and a voltage state circuit.

Said communication chip is connected to said central processor and used for information interaction between said central processor and outside; said communication chip is provided with interfaces (A, B); said central processor is connected to said drive circuit and used to transmit control signal to said drive circuit; said drive circuit is connected to said magnetic-hold relay via lead wire 10; one end of said voltage state circuit is connected to the extension wire of the dynamic spring assembly 2 via lead wire 9, and the other end is connected to said central processor, used to transmit operating state signal of said magnetic-hold relay to said central processor; and said deflector rod 4 extends out through a hole on said casing to allow manual operation; said communication chip adopts 485 chip; and said central processor adopts STC11F04E of Hoe John.

Figure 4:
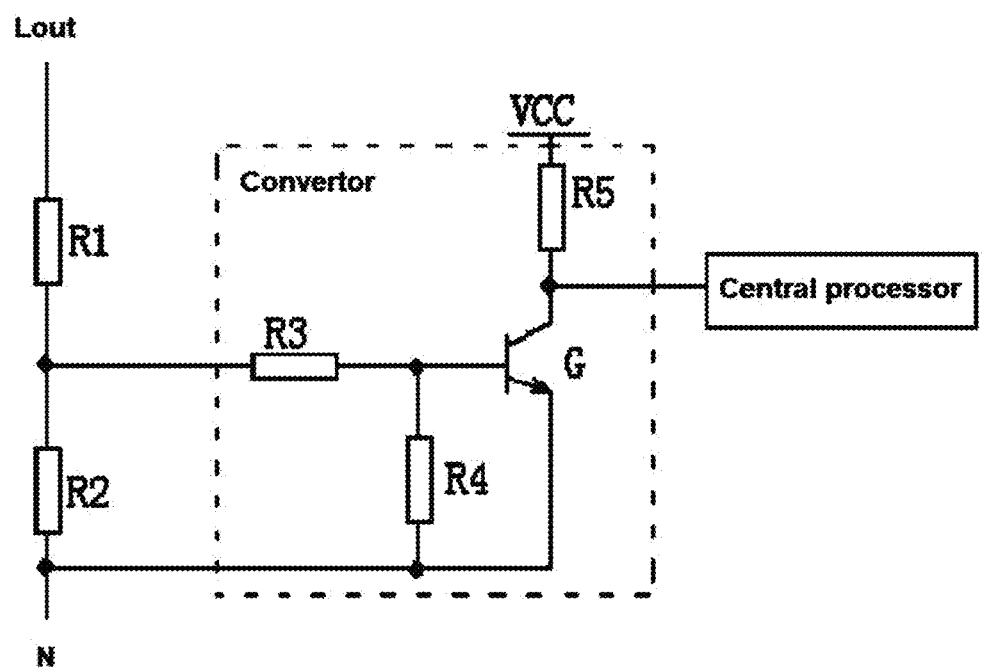
FIG. 4 is a schematic of the voltage state circuit of this invention.

Refer to FIG. 2 and FIG. 4. Said operating state signal is a voltage signal, and said voltage state circuit comprises two resistors R1, R2 and one convertor; wherein one end of the first resistor R1 is connected to the live wire Lout of commercial power supply, i.e. connected to extension wire of dynamic spring assembly 2 via lead wire 9, and the other end is connected to the second resistor R2 and the input end of said convertor, and the other end of said second resistor R2 is earthed; wherein the output end of said convertor is connected to said central processor and said convertor converts the voltage generated by voltage division of said two resistors R1, R2 to the input voltage of said central processor.

Said convertor comprises three resistors R3, R4, R5 and one triode G; wherein one end of resistor R3 is used as the input end of said convertor and the other end is connected to resistor R4 and base of said triode G, and the other end of resistor R4 is earthed; wherein emitter of said triode G is connected to one end of resistor R5 and used as output end of said convertor, collector of said triode G is earthed, and the other end of resistor R5 is connected to convertor power supply.

Said resistor R4 and said triode G in said convertor can be replaced by optic couplers for isolation between strong power source and the central processor.

Figure 5:
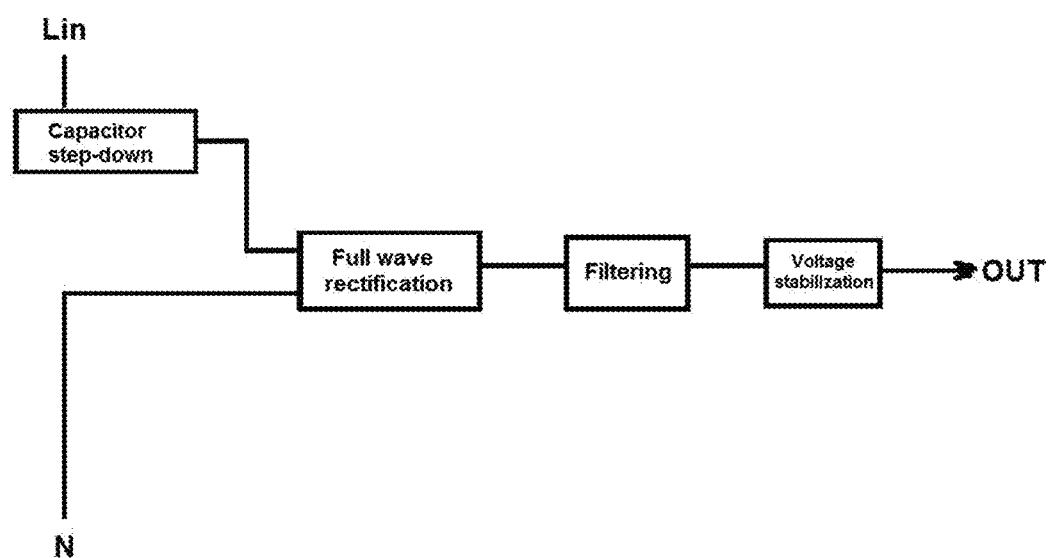
FIG. 5 is a schematic of the power supply circuit of this invention.

Refer to FIG. 2, FIG. 3, and FIG. 5. A power supply module is provided to supply power to circuit or module in said casing. Said power supply module is connected to commercial power live wire Lin via lead wire 12. Said power supply module comprises a capacitor step-down module, a full wave rectification module, a filtering module, and a voltage stabilization module; said capacitor step-down module realizes connection to commercial power live wire via current limiting; and said full wave rectification module can increase the current to reduce volume of the HV capacitor in said capacitor step-down module, so as to realize installation of power supply in the narrow space of existing low voltage one-pole (1P) miniature circuit breaker.

Figure 6:
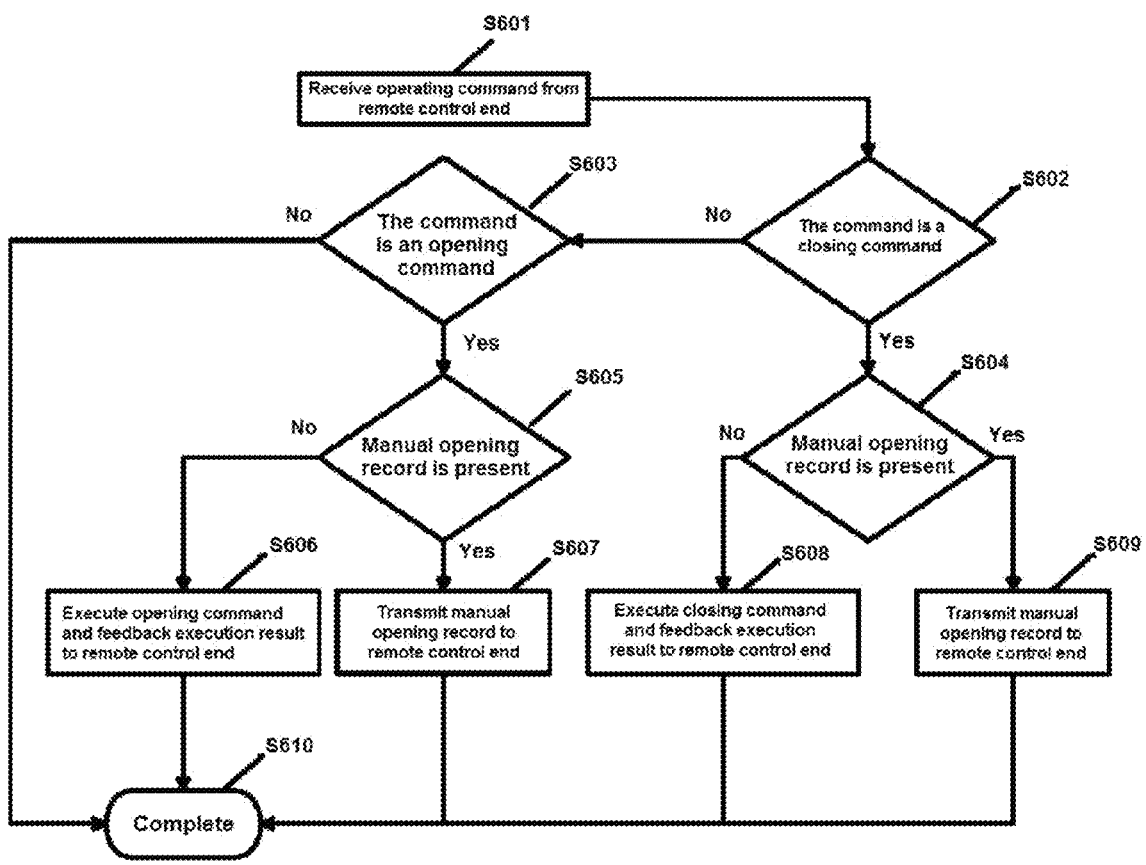
FIG. 6 is a flow diagram of circuit breaker control method under commercial power supply.

Refer to FIG. 6. A control method of a type of intelligent magnetic-hold miniature circuit breaker, comprising the following flow under commercial power supply: in step S601, said circuit breaker receives operating command from the remote control end; in step S602, this command is judged as a closing command or not; if positive, enter step S604, and if negative, enter step S603.

In step S604, judge presence of manual opening record; if present, enter step S609, and if not present, enter step S608.

In step S609, manual opening record is transmitted to said remote control end, and then enter step S610, at which the flow is complete. In step S608, execute the closing command and feedback execution result to said remote control end, and then enter step S610, at which the flow is complete.

In step S603, the operating command is judged as an opening command or not; if positive, enter step S605; if negative, enter step S610, at which the flow is complete.

In step S605, judge presence of manual opening record; if present, enter step S607; if not present, enter step S606.

In step S607, transmit manual opening record to said remote control end, and then enter step S610, at which the flow is complete. In step S606, execute the opening command and feedback execution result to said remote control end, and then enter step S610, at which the flow is complete.

Under commercial power supply, steps of generation and clearing of manual opening record are as follows: when said circuit breaker is manually opened, manual opening record is generated and notified to said remote control end; when said circuit breaker is manually closed, manual opening record is cleared, with said remote control end notified.

Figure 7:
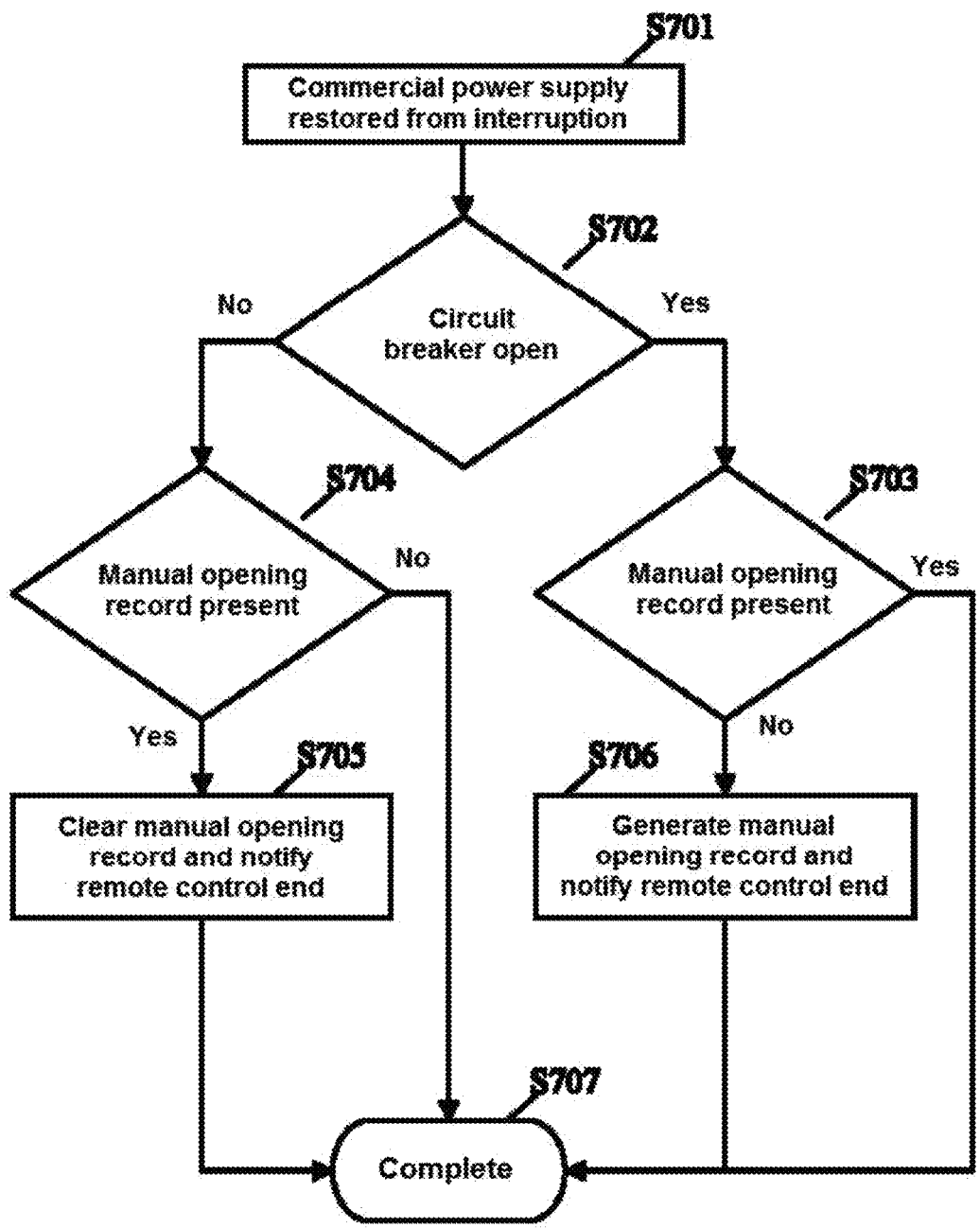
FIG. 7 is a flow diagram of generation and clearing of manual opening record in case of interruption of commercial power supply followed by its restoration.

Refer to FIG. 7. Flow of generation and clearing of manual opening record in case of interruption of commercial power supply followed by its restoration is as follows: in step S701, commercial power supply is restored after its interruption; in step S702, judge if said circuit breaker is open; if negative, enter step S704; if positive, enter step S703.

In step S704, judge presence of manual opening record. If present, enter step S705 to clear said manual opening record and notify said remote control end, and then enter step S707, at which the flow is complete. If not present, enter step S707, at which the flow is complete.

In step S703, judge presence of manual opening record. If present, enter step S707, at which the flow is complete. If not present, enter step S706 to generate manual opening record and notify said remote control end, and then enter step S707, at which the flow is complete.

This invention realizes priority of manual opening to remote controlled closing, eliminating safety hazard due to conflict between site maintenance and remote control. In addition to the above preferred embodiment, this invention may have other implementation modes. All technical schemes that adopt equivalent replacement or equivalent transformation shall fall within scope of protection requested by this invention.

What is claimed is:

1. An intelligent magnetic-hold miniature circuit breaker, comprising a casing, a magnetic-hold relay, and a drive circuit, a central processor, a communication chip, and a voltage state circuit, wherein said drive circuit is responsible for controlling said magnetic-hold relay which comprises a dynamic spring assembly, a static spring assembly, a deflector rod, a pushing piece, and a magnetic steel assembly, said communication chip is connected to said central processor, said central processor is connected to said drive circuit for transmitting control signals thereto, and one end of said voltage state circuit is connected to an extension wire of said dynamic spring assembly and its another end is connected to said central processor for transmitting operating state signals from said magnetic-hold relay to said central processor.

2. The intelligent magnetic-hold miniature circuit breaker according to claim 1, wherein said magnetic steel assembly drives via rotation said deflector rod and then via said pushing piece to effect closing or opening of contacts between said dynamic spring assembly and said static spring assembly and said deflector rod extends out through a hole on said casing to allow manual operation.

3. The intelligent magnetic-hold miniature circuit breaker according to claim 2, wherein said operating state signal is a voltage signal, and said voltage state circuit comprises a first resistor and a second resister and one convertor, one end of the first resistor is connected to power supply and its another end is connected to one end of said second resistor and an input end of said convertor, another end of said second resistor is earthed, an output end of said convertor is connected to said central processor and is responsible for converting voltage generated by voltage division of said two resistors to input voltage of said central processor.

4. The intelligent magnetic-hold miniature circuit breaker according to claim 3, wherein said convertor further comprises a third resistor and one triode having a base, an emitter and a collector, one end of said first resistor is used as an input end and its another end is connected to said second resistor and said base of said triode, another end of said second resistor is earthed, said emitter of said triode is connected to one end of said third resistor and used as output end of said convertor, said collector of said triode is earthed, and another end of said third resistor is connected to power supply.

5. The intelligent magnetic-hold miniature circuit breaker according to claim 4, wherein said second resistor and said triode in said convertor is replaced with optic couplers for isolation between strong power source and the central processor.

6. The intelligent magnetic-hold miniature circuit breaker according to claim 2, further comprising a power supply module to supply power to circuits or modules in said casing.

7. The intelligent magnetic-hold miniature circuit breaker according to claim 6, wherein said power supply module comprises a capacitor step-down module, a full wave rectification module, a filtering module, and a voltage stabilization module.

8. A control method of a type of intelligent magnetic-hold miniature circuit breaker, comprising a process of receiving an operating command from a remote control end and determining (a) whether the command is a closing command and if it is a closing command, further determining (b) where there is a record of manual operation and transmitting the record of manual operation to said remote control end if the determination in step (b) is positive or executing a closing command and feedbacking the execution result to said remote control end if the determination in step (b) is negative, or if the determination in step (a) is negative, further determining (c) whether the command is an opening command and, if the command is an opening command, further determining (d) whether there is a record of manual operation and transmitting the manual opening record to said remote control end if the determination in step (d) is positive or executing the opening command and feedbacking the execution result to said remote control end if the determination in step (d) is negative.

9. The control method according to claim 8, further comprising a step of generating a manual opening record and notifying said remote control end when said circuit breaker is manually opened and a step of clearing a manual opening record and notifying said remote control end when said circuit breaker is manually closed.

10. The control method according to claim 8, further comprising a step of generating and clearing a manual opening record in case of an interruption of power supply followed by its restoration, said step comprising determining whether said circuit breaker is open and, if said circuit breaker is not open, determining whether there is a manual opening record and, if there is a manual opening record, clearing this manual opening record and notifying said remote control end accordingly, or if said circuit breaker is open, determining whether there is a manual opening record and, if there is no manual opening record, generating a manual opening record and notifying said remote control end accordingly.

* * * * *